(12) United States Patent
Jeon et al.

(10) Patent No.: US 11,099,742 B2
(45) Date of Patent: Aug. 24, 2021

(54) ELECTRONIC DEVICE

(71) Applicant: SK hynix Inc., Gyeonggi-do (KR)

(72) Inventors: Jeong Ho Jeon, Gyeonggi-do (KR); Ji Hoon Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 66 days.

(21) Appl. No.: 16/537,197

(22) Filed: Aug. 9, 2019

(65) Prior Publication Data

US 2020/0192582 A1    Jun. 18, 2020

(30) Foreign Application Priority Data

Dec. 12, 2018    (KR) .......... 10-2018-0159954

(51) Int. Cl.
*G06F 12/00*    (2006.01)
*G06F 3/06*    (2006.01)

(52) U.S. Cl.
CPC .......... *G06F 3/0614* (2013.01); *G06F 3/0631* (2013.01); *G06F 3/0653* (2013.01); *G06F 3/0656* (2013.01); *G06F 3/0673* (2013.01)

(58) Field of Classification Search
CPC .... G06F 3/0614; G06F 3/0631; G06F 3/0653; G06F 3/0656; G06F 3/0673
See application file for complete search history.

(56) References Cited

U.S. PATENT DOCUMENTS

| | | | |
|---|---|---|---|
| 9,436,595 B1 | 9/2016 | Benitez et al. |
| 2003/0095560 A1* | 5/2003 | Arita et al. |
| 2006/0282573 A1* | 12/2006 | Maeda et al. |
| 2008/0052537 A1* | 2/2008 | Nishizono |
| 2009/0185625 A1* | 7/2009 | Lee et al. |
| 2011/0309868 A1* | 12/2011 | Itozawa et al. |
| 2020/0293028 A1* | 9/2020 | Tadano et al. |

* cited by examiner

*Primary Examiner* — Shawn X Gu
*Assistant Examiner* — Mohammad S Hasan
(74) *Attorney, Agent, or Firm* — IP & T Group LLP (57) ABSTRACT

An electronic device may include: a controller; a non-transitory computer-readable storage medium configured to store operation codes for causing the controller to perform operations; and a buffer configured to temporarily store data between a host device and the non-transitory computer-readable storage medium through control of the controller, wherein the operations comprise monitoring a foreground buffer usage rate of the buffer in response to a command of the host device and adjusting a foreground buffer capacity for the command in the buffer, based on the monitored foreground buffer usage rate.

18 Claims, 6 Drawing Sheets

ELECTRONIC DEVICE

CROSS-REFERENCES TO RELATED APPLICATION

The present application claims priority under 35 U.S.C. § 119(a) to Korean application number 10-2018-0159954, filed on Dec. 12, 2018, in the Korean Intellectual Property Office, which is incorporated herein by reference in its entirety.

BACKGROUND

1. Technical Field

Various embodiments generally relate to an electronic device, and more particularly, to an electronic device including a nonvolatile memory device.

2. Related Art

An electronic device may include a nonvolatile memory device. The electronic device may be a memory system. The electronic device may store data provided from a host device, in response to a write command of the host device, and may provide stored data to the host device, in response to a read command of the host device. The host device as an electronic device capable of processing data may include a computer, a digital camera or a mobile phone. The electronic device may operate by being built in the host device, or may operate by being manufactured in a separable form and being coupled to the host device.

SUMMARY

Various embodiments are directed to an electronic device and an operating method thereof, capable of preventing a phenomenon that a latency with respect to a host device abruptly increases.

In an embodiment, an electronic device may include: a controller; a non-transitory computer-readable storage medium configured to store operation codes for the controller to perform operations; and a buffer configured to temporarily store data between a host device and the non-transitory computer-readable storage medium through control of the controller, wherein the operations comprise monitoring a foreground buffer usage rate of the buffer in response to a command of the host device and adjusting a foreground buffer capacity for the command in the buffer, based on the monitored foreground buffer usage rate.

In an embodiment, an electronic device may include: a nonvolatile memory device; a buffer configured to temporarily store data between a host device and the nonvolatile memory device; and a buffer management circuit configured to manage a foreground buffer capacity for a foreground operation and a background buffer capacity for a background operation in the buffer, wherein the buffer management circuit increases the background buffer capacity when a foreground buffer usage rate of the buffer exceeds a threshold value.

In an embodiment, an electronic device may include: a memory device; a controller suitable for controlling the memory device to perform foreground and background operations; and a buffer having a first capacity for the foreground operation and a second capacity for the background operation, suitable for storing data associated with one of the operations, wherein the controller determines a usage rate of the buffer corresponding to the stored data, and adjusts the capacity based on the usage rate when the usage rate exceeds a threshold value.

The electronic device and the operating method thereof according to the embodiments may prevent a phenomenon that a latency with respect to a host device abruptly increases.

DETAILED DESCRIPTION

In the present disclosure, advantages, features and methods for achieving them will become more apparent after a reading of the following exemplary embodiments taken in conjunction with the accompanying drawings. The present disclosure may, however, be embodied in different forms and should not be construed as being limited to the embodiments set forth herein. Rather, these embodiments are provided to describe the present disclosure in detail to the extent that a person skilled in the art to which the disclosure pertains can easily carry out the technical ideas of the present disclosure.

It is to be understood herein that embodiments of the present disclosure are not limited to the particulars shown in the drawings and that the drawings are not necessarily to scale and in some instances proportions may have been exaggerated in order to more clearly depict certain features of the disclosure. While particular terminology is used herein, it is to be appreciated that the terminology used herein is for the purpose of describing particular embodiments only and is not intended to limit the scope of the present disclosure.

It is noted that reference to "an embodiment," "another embodiment" or the like does not necessarily mean only one embodiment, and different references to any such phrase are not necessarily to the same embodiment(s).

As used herein, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. The articles 'a' and 'an' as used in this application and the appended claims should generally be construed to mean 'one or more' unless specified otherwise or clear from context to be directed to a singular form. It will be further understood that the terms "includes" and/or "including," when used in this specification, specify the presence of at least one stated feature, step, operation, and/or element, but do not preclude the presence or addition of one or more other features, steps, operations, and/or elements thereof.

Hereinafter, an electronic device will be described below with reference to the accompanying drawings through various examples of embodiments.

Figure 1A:
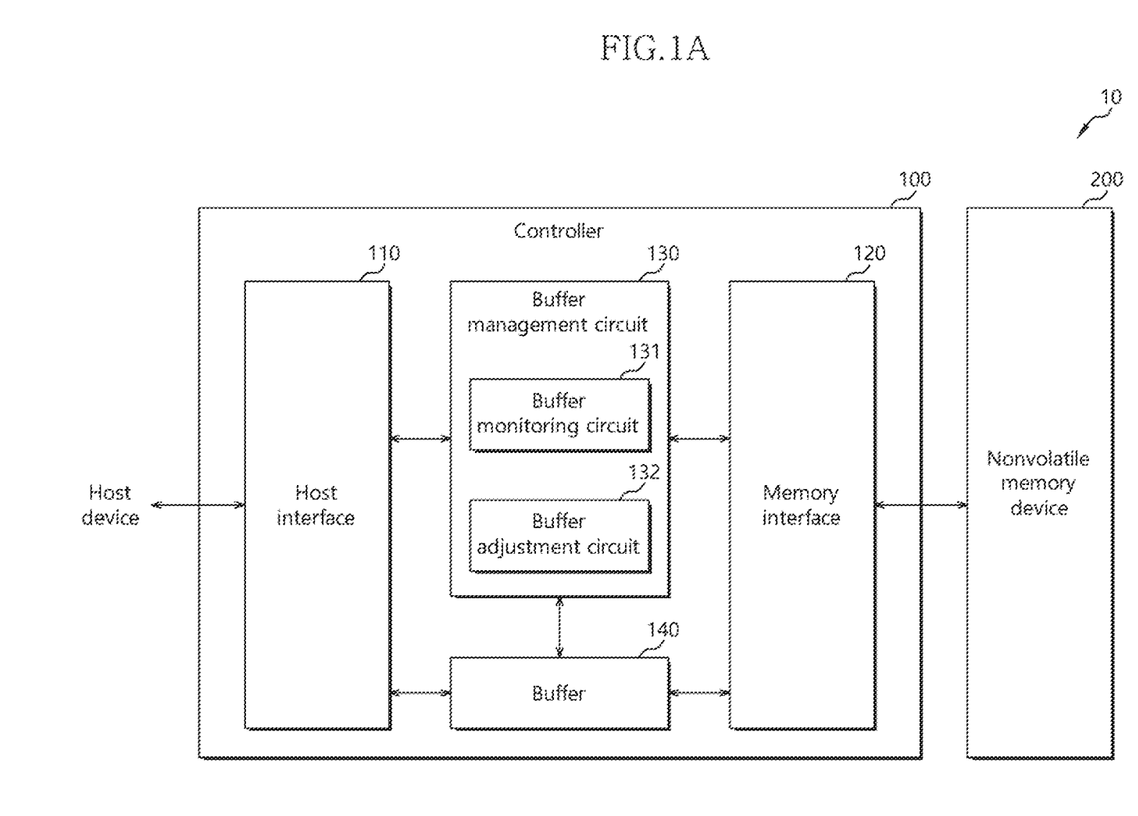
FIG. 1A is a block diagram illustrating an electronic device in accordance with an embodiment.

FIG. 1A is a block diagram illustrating an electronic device 10 in accordance with an embodiment.

Referring to FIG. 1A, the electronic device 10 may be configured to store data provided from an external host device, in response to a write command from the host device. Also, the electronic device 10 may be configured to provide stored data to the host device, in response to a read command of the host device.

The electronic device 10 may include a memory system. The electronic device 10 may be configured by a Personal Computer Memory Card International Association (PCM-CIA) card, a compact flash (CF) card, a smart media card, a memory stick, a multimedia card in the form of MMC, eMMC, RS-MMC and MMC-micro, a secure digital card in the form of SD, mini-SD and micro-SD, a universal flash storage (UFS), or a solid state drive (SSD).

The electronic device 10 may include a controller 100 and a nonvolatile memory device 200.

The controller 100 may control general operations of the electronic device 10. The controller 100 may control the nonvolatile memory device 200 to perform a foreground operation according to a command of the host device. The foreground operation may include an operation of writing data in the nonvolatile memory device 200 and reading data from the nonvolatile memory device 200 according to a write command and a read command of the host device, respectively.

Further, the controller 100 may control the nonvolatile memory device 200 to perform a background operation that is internally required, independently of a command of the host device. The background operation may include a wear leveling operation, a garbage collection operation and an erase operation for the nonvolatile memory device 200. Like the foreground operation, the background operation may also include an operation of writing data in the nonvolatile memory device 200 and reading data from the nonvolatile memory device 200.

The controller 100 may include a host interface 110, a memory interface 120, a buffer management circuit 130 and a buffer 140.

The host interface 110 may be coupled with the host device. The host interface 110 may receive a write command from the host device and may request the buffer management circuit 130 to allocate a buffer region (not illustrated) of the buffer 140. The host interface 110 may store write data received from the host device in the buffer region allocated in the buffer 140. The write data may be temporarily stored in the buffer region allocated in the buffer 140, until the write data is written in the nonvolatile memory device 200.

As another example, the host interface 110 may receive a read command from the host device and may request the buffer management circuit 130 to allocate a buffer region of the buffer 140. Read data read from the nonvolatile memory device 200 may be temporarily stored in the buffer region allocated in the buffer 140, until the read data is transmitted to the host device. After transmitting the read data stored in the buffer 140 to the host device, the host interface 110 may request the buffer management circuit 130 to release the buffer region allocated for the read data. The released buffer region becomes free, and may be used to store another data.

The memory interface 120 may be coupled with the nonvolatile memory device 200. The memory interface 120 may control the nonvolatile memory device 200 to write write data in the nonvolatile memory device 200 and read read data from the nonvolatile memory device 200.

When the host device transmits a write command, the memory interface 120 may write the write data stored in the buffer 140 in the nonvolatile memory device 200. Thereafter, the memory interface 120 may request the buffer management circuit 130 to release the buffer region allocated for the write data. The released buffer region becomes free, and may be used to store another data.

When the host device transmits a read command, the memory interface 120 may store the read data read from the nonvolatile memory device 200 in the buffer region allocated in the buffer 140. The read data may be temporarily stored in the buffer region allocated in the buffer 140, until the read data is transmitted to the host device.

Further, similarly to the above-described processing for a foreground operation, if a background operation is scheduled in the electronic device 10, the memory interface 120 may request the buffer management circuit 130 to allocate a buffer region included in the buffer 140, to temporarily store write data or read data with respect to the nonvolatile memory device 200.

The buffer management circuit 130 may allocate and release a buffer region included in the buffer 140, for a foreground operation or a background operation, according to a request of the host interface 110 or the memory interface 120.

The buffer management circuit 130 may manage a foreground buffer capacity and a background buffer capacity for the buffer 140. The foreground buffer capacity may be the maximum capacity of a buffer region which may be allocated in the buffer 140 to process a command of the host device. That is, the foreground buffer capacity may be the maximum capacity of a buffer region which may be allocated for a foreground operation in the buffer 140. In other words, the buffer management circuit 130 cannot allocate a buffer region for a foreground operation, to exceed a current foreground buffer capacity. The background buffer capacity may be the maximum capacity of a buffer region which may be allocated for a background operation in the buffer 140. In other words, the buffer management circuit 130 cannot allocate a buffer region for a background operation, to exceed a current background buffer capacity.

The buffer management circuit 130 may maintain the sum of the foreground buffer capacity and the background buffer capacity at a preset constant value. Namely, the foreground buffer capacity and the background buffer capacity may be in a tradeoff relationship. By way of example, in the following descriptions, the foreground buffer capacity and the background buffer capacity will be described as percentages, and the sum thereof may be 100.

According to an embodiment, the buffer 140 may further include buffer regions (not illustrated) which may be allocated for operations other than a foreground operation and a background operation.

The buffer management circuit 130 may include a buffer monitoring circuit 131 and a buffer adjustment circuit 132.

The buffer monitoring circuit 131 may monitor a foreground buffer usage rate of the buffer 140 according to a command of the host device. The foreground buffer usage rate may be the capacity rate of a buffer region which is currently allocated for a foreground operation in the buffer 140. The foreground buffer usage rate may be less than or equal to the foreground buffer capacity. In particular, the buffer monitoring circuit 131 may monitor an increase in foreground buffer usage rate due to an abrupt increase in throughput with respect to the host device.

In detail, the buffer monitoring circuit 131 may monitor whether the foreground buffer usage rate exceeds a threshold value. According to an embodiment, the buffer monitoring circuit 131 may monitor whether the foreground buffer usage rate exceeds at least two threshold values in a stepwise manner. The buffer monitoring circuit 131 may transmit a monitoring result to the buffer adjustment circuit 132.

The buffer adjustment circuit 132 may adjust the foreground buffer capacity and the background buffer capacity based on the monitoring result of the buffer monitoring circuit 131. In detail, when the foreground buffer usage rate does not exceed the threshold value, the buffer adjustment circuit 132 may set the foreground buffer capacity and the background buffer capacity to preset normal values, respectively. As described above, the sum of the preset normal values of the foreground buffer capacity and the background buffer capacity may be 100.

According to an embodiment, the normal value of the foreground buffer capacity may be 100, and the normal value of the background buffer capacity may be 0. Thus, in the embodiment, the performance of a foreground operation may be maximized. Under this situation, in the case where a background operation needs to be performed, the buffer adjustment circuit 132 may increase the background buffer capacity from 0 while decreasing the foreground buffer capacity from 100.

When the foreground buffer usage rate exceeds the threshold value, the buffer adjustment circuit 132 may decrease the foreground buffer capacity. At this time, the buffer adjustment circuit 132 may increase the background buffer capacity while decreasing the foreground buffer capacity.

The buffer adjustment circuit 132 may adjust the foreground buffer capacity and the background buffer capacity based on a preset adjustment value.

The threshold value may be less than a minimum value that may be set as the foreground buffer capacity. For example, if the foreground buffer capacity may be decreased to 85 at the minimum, the threshold value may be set to a value less than 85.

According to an embodiment, when it is monitored by the buffer monitoring circuit 131 whether the foreground buffer usage rate exceeds at least two threshold values in a stepwise manner, the buffer adjustment circuit 132 may adjust the foreground buffer capacity and the background buffer capacity in a stepwise manner. For example, it may be monitored in a stepwise manner by the buffer monitoring circuit 131 whether the foreground buffer usage rate exceeds a first threshold value and a second threshold value greater than the first threshold value. The buffer adjustment circuit 132 may decrease the foreground buffer capacity by a first adjustment value when the foreground buffer usage rate exceeds the first threshold value, and may further decrease the foreground buffer capacity by a second adjustment value when the foreground buffer usage rate exceeds the second threshold value. When the foreground buffer capacity is decreased in a stepwise manner, the background buffer capacity may be increased conversely in a stepwise manner.

According to an embodiment, the preset first adjustment value and second adjustment value may be equal to or different from each other.

Meanwhile, a method for the buffer adjustment circuit 132 to decrease/increase the foreground buffer capacity/the background buffer capacity in a stepwise manner through three or more steps may be similar to the above-described method that uses two steps.

In summary, if a throughput with respect to the host device abruptly increases and the foreground buffer capacity is continuously maintained at or close to 100 as a maximum value in the buffer 140 to maximize the performance of a foreground operation, a background operation that needs to be processed during the foreground operation may be substantially difficult to be processed. That is, while the background buffer capacity may be barely secured each time the foreground operation is processed, the background operation may be performed by being allocated with a buffer region only after the background buffer capacity is secured. Thus, when a throughput with respect to the host device increases, the background operation may cause a bottleneck phenomenon in the foreground operation, and this may increase a latency with respect to the host device.

Therefore, in the embodiment, when a throughput with respect to the host device increases and thereby the foreground buffer usage rate increases, the throughput of the foreground operation may be decreased by decreasing in advance the foreground buffer capacity. At this time, in the embodiment, by increasing in advance the background buffer capacity at the same time when decreasing in advance the foreground buffer capacity, it is possible to smoothly perform the background operation. By smoothly performing the background operation, a latency with respect to the host device may be maintained constantly.

Referring again to FIG. 1A, the buffer 140 may temporarily store data to be transmitted and received between the host device and the nonvolatile memory device 200. The buffer 140 may include buffer regions (not illustrated) in which data is actually stored.

The buffer 140 may include a Static Random Access Memory (SRAM), a Dynamic Random Access Memory (DRAM), and the like.

Figure 1B:
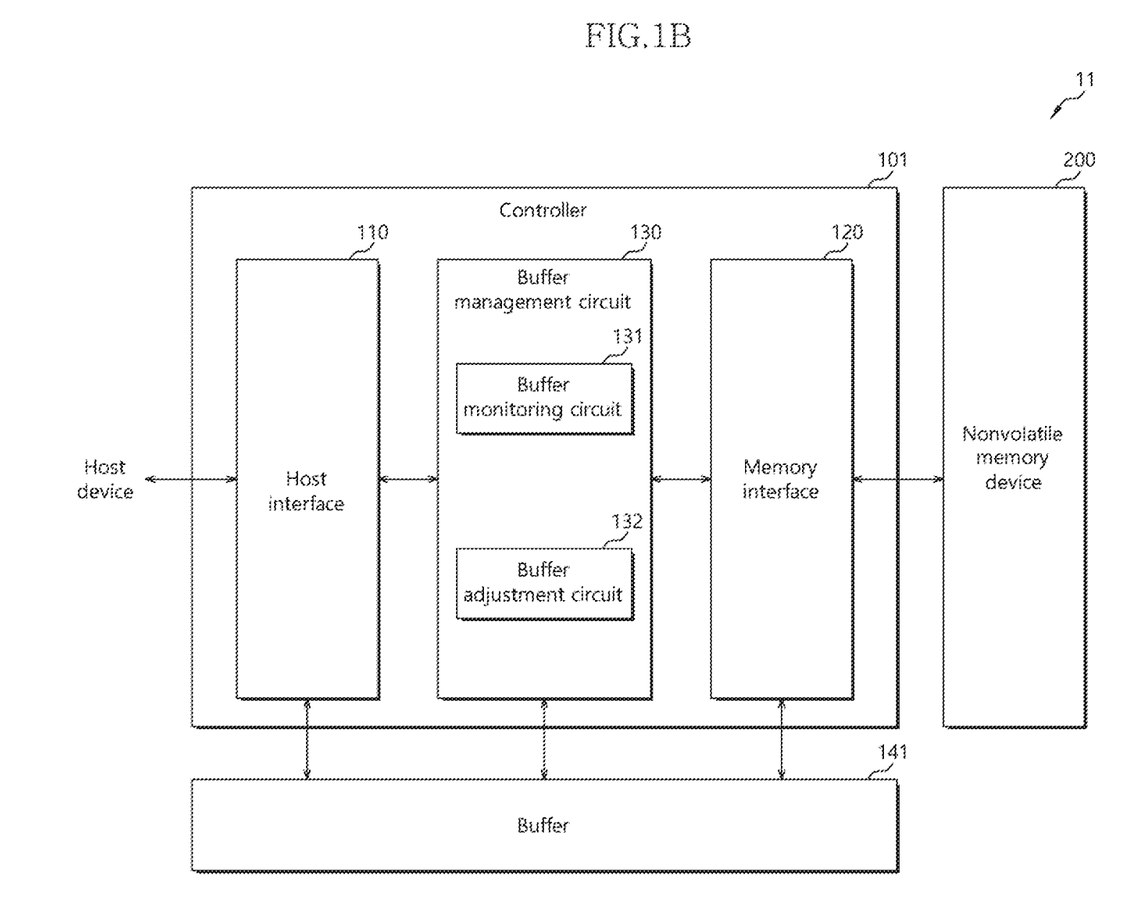
FIG. 1B is a block diagram illustrating an electronic device in accordance with an embodiment.

FIG. 1B is a block diagram illustrating an electronic device 11 in accordance with an embodiment.

Referring to FIG. 1B, a buffer 141 may be disposed external to a controller 101 in the electronic device 11, instead of being disposed internally as shown in FIG. 1A. Except the position of the buffer 141, the configuration and operating method of the electronic device 11 may be the same as the configuration and operating method of the electronic device 10 illustrated in FIG. 1A. Therefore, hereunder, the feature of the embodiment will be described with reference to the electronic device 10 of FIG. 1A.

Referring back to FIG. 1A, the nonvolatile memory device 200 may store data received from the controller 100 and may read stored data and transmit the read data to the controller 100, under the control of the controller 100.

The nonvolatile memory device 200 may include a flash memory, such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

While it is illustrated in FIG. 1A that the electronic device 10 includes one nonvolatile memory device 200, it is to be noted that the number of nonvolatile memory devices included in the electronic device 10 is not limited thereto.

According to an embodiment, operations of the buffer management circuit 130 may be performed by operation codes. The operation codes may be stored in a non-transitory computer-readable storage medium, be loaded in the controller 100 and be executed by the controller 100. The non-transitory computer-readable storage medium may include the nonvolatile memory device 200.

Figure 2:
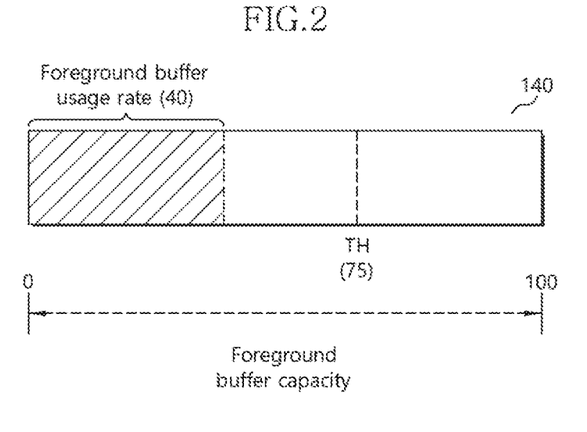
FIGS. 2 to 4 are diagrams illustrating examples of a method for managing a foreground buffer capacity and a background buffer capacity of a buffer in accordance with an embodiment.
Figure 3:
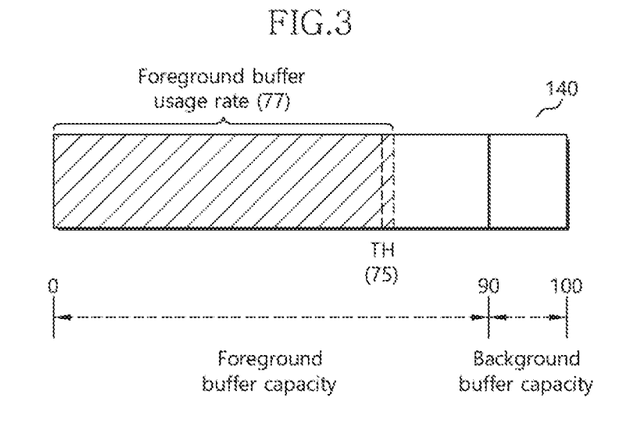
Figure 4:
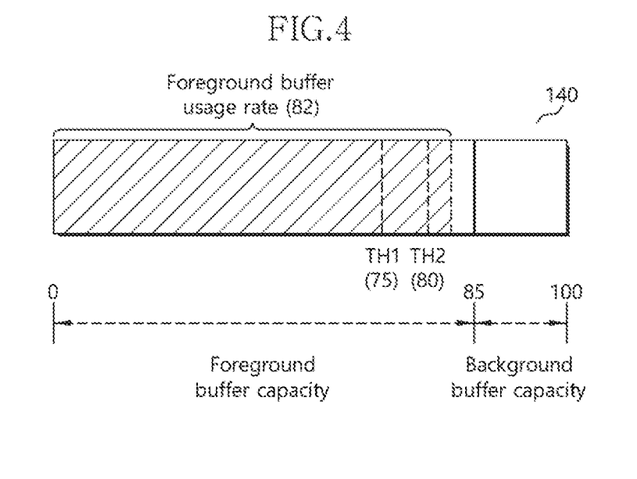

FIGS. 2 to 4 are diagrams illustrating examples of a method for managing a foreground buffer capacity and a background buffer capacity of a buffer in accordance with an embodiment. For example, the method of FIGS. 2 to 4 may be performed by the buffer management circuit 130 of FIG. 1A, which manages a foreground buffer capacity and a background buffer capacity of the buffer 140 of FIG. 1A. In FIGS. 2 to 4, it is assumed that the normal value of the foreground buffer capacity is 100 and the normal value of the background buffer capacity is 0.

Referring to FIG. 2, the foreground buffer usage rate of the buffer 140 that is monitored by the buffer monitoring circuit 131 of FIG. 1A is denoted by hatching. The foreground buffer usage rate may be 40 and may not exceed a threshold value TH of 75. Thus, since the foreground buffer usage rate does not exceed the threshold value TH, the buffer adjustment circuit 132 may set the foreground buffer capacity to 100 and set the background buffer capacity to 0.

Referring to FIG. 3, the foreground buffer usage rate may be 77 and may exceed the threshold value TH of 75. Thus, since the foreground buffer usage rate exceeds the threshold value TH, the buffer adjustment circuit 132 may decrease the foreground buffer capacity to 90 and increase the background buffer capacity to 10.

Referring to FIG. 4, the buffer monitoring circuit 131 may monitor an increase in foreground buffer usage rate through two steps based on a first threshold value TH1 and a second threshold value TH2. When the foreground buffer usage rate exceeds the first threshold value TH1 of 75 similarly to the situation illustrated in FIG. 3 and does not exceed the second threshold value TH2 of 80, the buffer adjustment circuit 132 may have decreased the foreground buffer capacity to 90 and have increased the background buffer capacity to 10.

Thereafter, as illustrated, the foreground buffer usage rate may be 82 and exceed the second threshold value TH2 of 80. Thus, since the foreground buffer usage rate exceeds the second threshold value TH2, the buffer adjustment circuit 132 may decrease the foreground buffer capacity to 85 and increase the background buffer capacity to 15.

Figure 5:
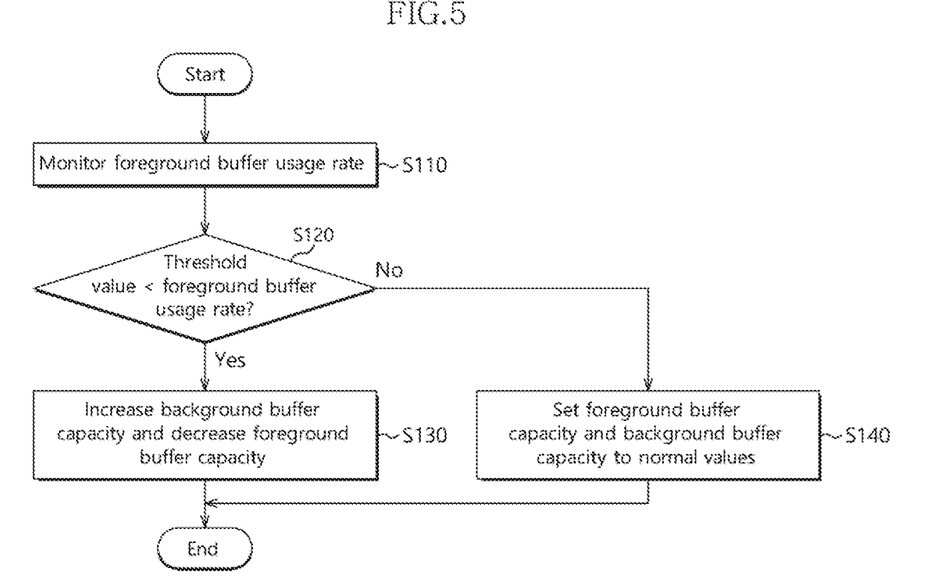
FIG. 5 is a flow chart illustrating a method for operating an electronic apparatus in accordance with an embodiment.

FIG. 5 is a flow chart illustrating a method for operating an electronic device (e.g., the electronic device 10 of FIG. 1A) in accordance with an embodiment. By way of example, FIG. 5 illustrates a method for the buffer management circuit 130 to adjust a foreground buffer capacity and a background buffer capacity in the buffer 140 through one step.

Referring to FIG. 5, at step S110, the buffer monitoring circuit 131 may monitor a foreground buffer usage rate in the buffer 140.

At step S120, the buffer monitoring circuit 131 may determine whether the foreground buffer usage rate exceeds a threshold value. When it is determined that the foreground buffer usage rate exceeds the threshold value (S120, YES), the process may proceed to step S130. When it is determined that the foreground buffer usage rate does not exceed the threshold value (S120, NO), the process may proceed to step S140.

At the step S130, the buffer adjustment circuit 132 may increase a background buffer capacity by a preset adjustment value and decrease a foreground buffer capacity by the adjustment value.

At the step S140, the buffer adjustment circuit 132 may set a foreground buffer capacity and a background buffer capacity to preset normal values.

Figure 6:
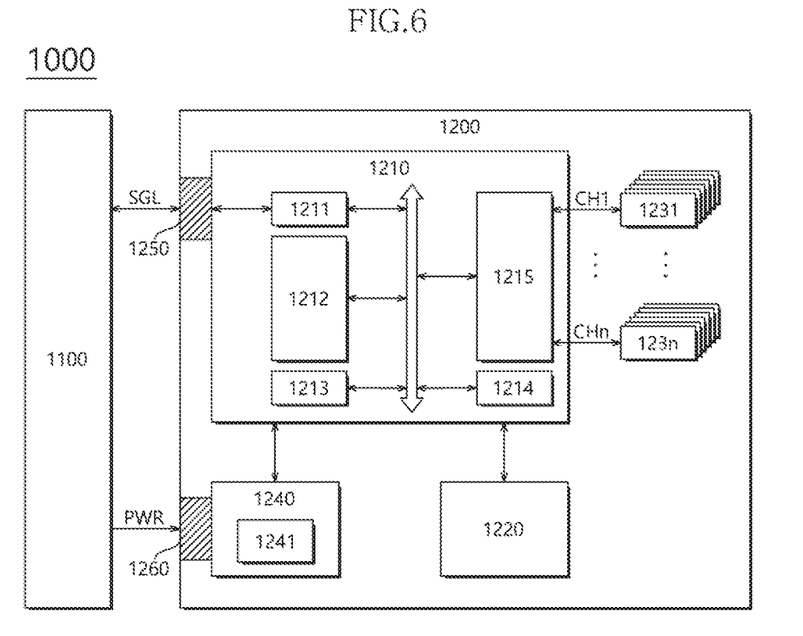
FIG. 6 is a diagram illustrating a data processing system including a solid state drive (SSD) in accordance with an embodiment.

FIG. 6 is a diagram illustrating a data processing system 1000 including a solid state drive (SSD) 1200 in accordance with an embodiment. Referring to FIG. 6, the data processing system 1000 may include a host device 1100 and the SSD 1200.

The SSD 1200 may include a controller 1210, a buffer memory device 1220, a plurality of nonvolatile memory devices 1231 to 123n, a power supply 1240, a signal connector 1250, and a power connector 1260.

The controller 1210 may control general operations of the SSD 1200. The controller 1210 may operate in the same manner as the controller 100 shown in FIG. 1A and the controller 101 shown in FIG. 1B.

The controller 1210 may include a host interface unit 1211, a control unit 1212, a random access memory 1213, an error correction code (ECC) unit 1214, and a memory interface unit 1215.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-e or PCIe) and universal flash storage (UFS).

The control unit 1212 may analyze and process the signal SGL received from the host device 1100. The control unit 1212 may control operations of internal function blocks according to a firmware or a software for driving the SSD 1200. The random access memory 1213 may be used as a working memory for driving such a firmware or software.

The ECC unit 1214 may generate the parity data of data to be transmitted to at least one of the nonvolatile memory devices 1231 to 123n. The generated parity data may be stored together with the data in the nonvolatile memory devices 1231 to 123n. The ECC unit 1214 may detect an error of the data read from at least one of the nonvolatile memory devices 1231 to 123n, based on the parity data. If a detected error is within a correctable range, the ECC unit 1214 may correct the detected error.

The memory interface unit 1215 may provide control signals such as commands and addresses to at least one of the nonvolatile memory devices 1231 to 123n, according to control of the control unit 1212. Moreover, the memory interface unit 1215 may exchange data with at least one of the nonvolatile memory devices 1231 to 123n, according to control of the control unit 1212. For example, the memory interface unit 1215 may provide the data stored in the buffer memory device 1220, to at least one of the nonvolatile memory devices 1231 to 123n, or provide the data read from at least one of the nonvolatile memory devices 1231 to 123n, to the buffer memory device 1220.

The buffer memory device 1220 may temporarily store data to be stored in at least one of the nonvolatile memory devices 1231 to 123n. Further, the buffer memory device 1220 may temporarily store the data read from at least one of the nonvolatile memory devices 1231 to 123n. The data temporarily stored in the buffer memory device 1220 may be transmitted to the host device 1100 or at least one of the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 7:
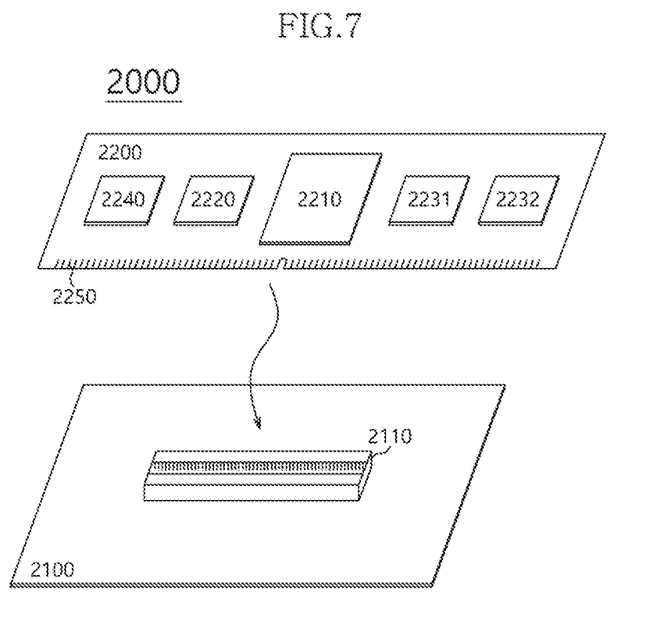
FIG. 7 is a diagram illustrating a data processing system including a memory system in accordance with an embodiment.

FIG. 7 is a diagram illustrating a data processing system 2000 including a memory system 2200 in accordance with an embodiment. Referring to FIG. 7, the data processing system 2000 may include a host device 2100 and the memory system 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot or a connector. The memory system 2200 may be mounted to the connection terminal 2110.

The memory system 2200 may be configured in the form of a board such as a printed circuit board. The memory system 2200 may be referred to as a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control general operations of the memory system 2200. The controller 2210 may be configured in the same manner as the controller 1210 shown in FIG. 6.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the memory system 2200.

The PMIC 2240 may provide the power inputted through the connection terminal 2250, to the inside of the memory system 2200. The PMIC 2240 may manage the power of the memory system 2200 according to control of the controller 2210.

The connection terminal 2250 may be coupled to the connection terminal 2110 of the host device 2100. Through the connection terminal 2250, signals such as commands, addresses, data and so forth and power may be transferred between the host device 2100 and the memory system 2200. The connection terminal 2250 may be configured into various types depending on an interface scheme between the host device 2100 and the memory system 2200. The connection terminal 2250 may be disposed on any one side of the memory system 2200.

Figure 8:
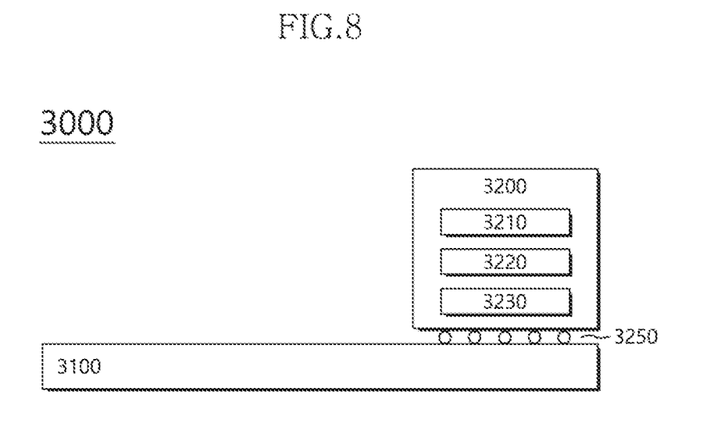
FIG. 8 is a diagram illustrating a data processing system including a memory system in accordance with an embodiment.

FIG. 8 is a diagram illustrating a data processing system 3000 including a memory system 3200 in accordance with an embodiment. Referring to FIG. 8, the data processing system 3000 may include a host device 3100 and the memory system 3200.

The host device 3100 may be configured in the form of a board such as a printed circuit board. Although not shown, the host device 3100 may include internal function blocks for performing the function of a host device.

The memory system 3200 may be configured in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control general operations of the memory system 3200. The controller 3210 may be configured in the same manner as the controller 1210 shown in FIG. 6.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the memory system 3200.

Figure 9:
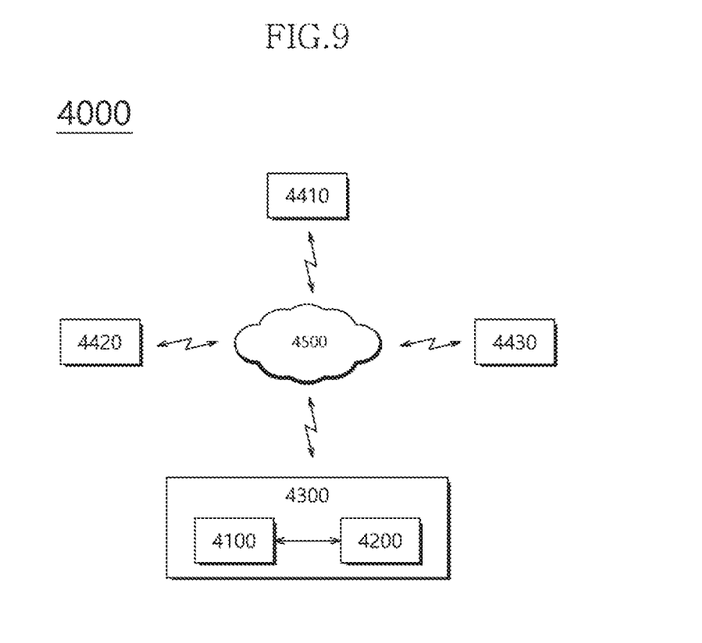
FIG. 9 is a diagram illustrating a network system including a memory system in accordance with an embodiment.

FIG. 9 is a diagram illustrating a network system 4000 including a memory system 4200 in accordance with an embodiment. Referring to FIG. 9, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the memory system 4200. The memory system 4200 may be configured by the electronic device 10 shown in FIG. 1A, the electronic device 11 shown in FIG. 1B, the SSD 1200 shown in FIG. 6, the memory system 2200 shown in FIG. 7 or the memory system 3200 shown in FIG. 8.

Figure 10:
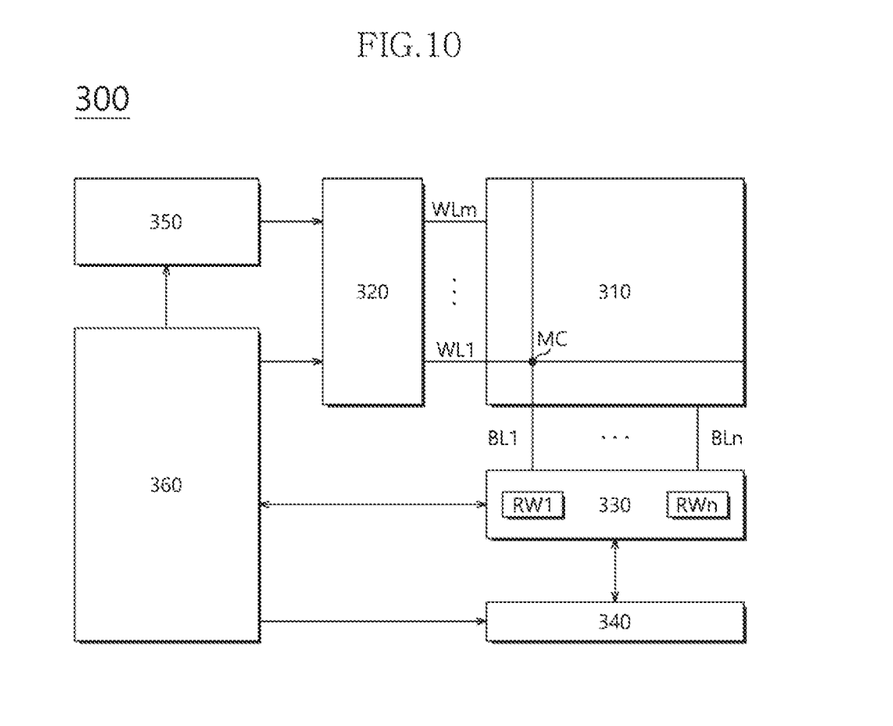
FIG. 10 is a block diagram illustrating a nonvolatile memory device included in a memory system in accordance with an embodiment.

FIG. 10 is a block diagram illustrating a nonvolatile memory device 300 included in a memory system in accordance with an embodiment. Referring to FIG. 10, the nonvolatile memory device 300 may include a memory cell array 310, a row decoder 320, a data read and write (read/write) block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode an address provided from an external device (e.g., the controller 100 of FIG. 1A). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

While various embodiments have been described above, it will be understood to those skilled in the art that the embodiments described are examples only. Accordingly, the electronic device described herein should not be limited based on the described embodiments.

What is claimed is:

1. An electronic device comprising:
a controller;
a non-transitory computer-readable storage medium configured to store operation codes for the controller to perform operations; and
a buffer configured to temporarily store data between a host device and the non-transitory computer-readable storage medium through control of the controller,
wherein the operations comprise monitoring a foreground buffer usage rate of the buffer in response to a command of the host device and adjusting a foreground buffer capacity for the command in the buffer, based on the monitored foreground buffer usage rate,
wherein the adjusting of the foreground buffer capacity comprises decreasing the foreground buffer capacity when the foreground buffer usage rate exceeds a threshold value.

2. The electronic device according to claim 1, wherein the adjusting of the foreground buffer capacity comprises decreasing the foreground buffer capacity in a stepwise manner each time the foreground buffer usage rate exceeds at least two threshold values in a stepwise manner.

3. The electronic device according to claim 1, wherein the adjusting of the foreground buffer capacity comprises increasing a background buffer capacity for a background operation while decreasing the foreground buffer capacity.

4. The electronic device according to claim 3, wherein the increasing of the background buffer capacity comprises decreasing the foreground buffer capacity when the foreground buffer usage rate exceeds a threshold value.

5. The electronic device according to claim 3, wherein a sum of the foreground buffer capacity and the background buffer capacity is maintained at a preset value.

6. The electronic device according to claim 3, wherein the adjusting of the foreground buffer capacity comprises decreasing the background buffer capacity to 0 when the foreground buffer usage rate does not exceed the threshold value.

7. The electronic device according to claim 6, wherein the adjusting of the foreground buffer capacity comprises increasing the background buffer capacity when the background operation is scheduled.

8. The electronic device according to claim 1, wherein the buffer is included in the controller.

9. The electronic device according to claim 1, wherein the controller controls the data to be moved among the host device, the buffer and the non-transitory computer-readable storage medium according to the command of the host device.

10. The electronic device according to claim 9, wherein the operations comprise reading the data from the non-transitory computer-readable storage medium according to the command of the host device.

11. The electronic device according to claim 9, wherein the operations comprise storing the data in the non-transitory computer-readable storage medium according to the command of the host device.

12. An electronic device comprising:
a nonvolatile memory device;
a buffer configured to temporarily store data between a host device and the nonvolatile memory device; and
a buffer management circuit configured to manage a foreground buffer capacity for a foreground operation and a background buffer capacity for a background operation in the buffer,
wherein the buffer management circuit increases the background buffer capacity when a foreground buffer usage rate of the buffer exceeds a threshold value.

13. The electronic device according to claim 12, wherein, when the foreground buffer usage rate exceeds the threshvalue, the buffer management circuit decreases the foreground buffer capacity when increasing the background buffer capacity.

14. The electronic device according to claim 13, wherein the buffer management circuit maintains a sum of the foreground buffer capacity and the background buffer capacity at a preset value.

15. The electronic device according to claim 13, wherein the buffer management circuit decreases the background buffer capacity to 0 when the foreground buffer usage rate does not exceed the threshold value.

16. The electronic device according to claim 15, wherein the buffer management circuit increases the background buffer capacity when the background operation is scheduled.

17. The electronic device according to claim 12, wherein the buffer management circuit increases the background buffer capacity in a stepwise manner each time the foreground buffer usage rate exceeds at least two threshold values in a stepwise manner.

18. An electronic device comprising:
 a memory device;
 a controller suitable for controlling the memory device to perform foreground and background operations; and
 a buffer having a first capacity for the foreground operation and a second capacity for the background operation, suitable for storing data associated with one of the foreground and background operations,
 wherein the controller determines a usage rate of the buffer corresponding to data associated with the foreground operation, and decreases the first capacity and increases the second capacity when the usage rate exceeds a threshold value.

* * * * *